Figure 1:
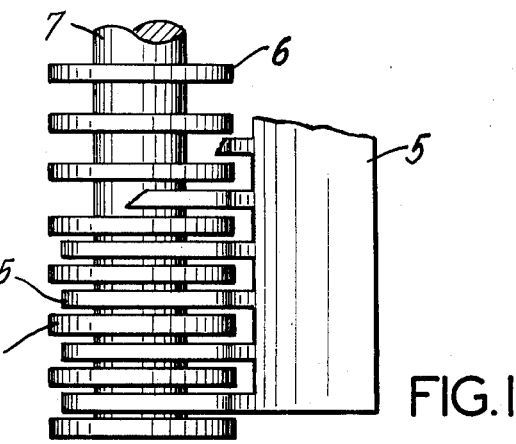

United States Patent [19]

Hayashi

[11] 4,372,438
[45] * Feb. 8, 1983

[54] APPARATUS FOR ADJUSTING INTERVALS OF OBJECTS BEING CONVEYED

[76] Inventor: Torahiko Hayashi, 2-3, Nozawa-machi, Utsunomiya-shi, Tochigi-ken, Japan

[*] Notice: The portion of the term of this patent subsequent to Apr. 15, 1992, has been disclaimed.

[21] Appl. No.: 206,633

[22] Filed: Nov. 13, 1980

Related U.S. Application Data

[63] Continuation of Ser. No. 38,215, May 11, 1979, abandoned, which is a continuation of Ser. No. 782,040, Mar. 28, 1977, abandoned, which is a continuation-in-part of Ser. No. 591,041, Jun. 27, 1975, abandoned, which is a continuation-in-part of Ser. No. 287,899, Sep. 11, 1972, abandoned.

[30] Foreign Application Priority Data

Sep. 10, 1971 [JP] Japan ............................. 46-70161

[51] Int. Cl.³ ............................................ B65G 47/32
[52] U.S. Cl. ..................................... 198/459; 198/474
[58] Field of Search ....................... 198/459, 461, 474; 271/118, 198, 202, 203

[56] References Cited

U.S. PATENT DOCUMENTS 3,353,652 11/1967 Fellner ............................... 198/474
3,700,090 10/1972 Pearson ......................... 198/474 X
3,877,563 4/1975 Hayashi .......................... 198/459 X

FOREIGN PATENT DOCUMENTS 2244528 3/1973 Fed. Rep. of Germany ...... 198/459
1346407 11/1963 France ................................. 198/459
1034055 6/1966 United Kingdom ............... 198/459

OTHER PUBLICATIONS

IBM Technical Disclosure Bulletin, vol. 14, No. 2, Jul. 1971, pp. 464-465; Inman et al.

Primary Examiner—Jeffrey V. Nase
Attorney, Agent, or Firm—Guy W. Shoup; Gerard F. Dunne

[57] ABSTRACT

An apparatus for adjusting the intervals between soft objects being conveyed comprises the combination of a member provided with a plurality of slits parallel to the direction of movement of the objects and a rotating shaft positioned underneath said member at right angles to the direction of movement of the objects. The shaft is provided with a plurality of flanges thereabout. This combination is positioned between a feed conveyor and a receiving conveyor and the flanges are arranged to reciprocate through the slits of the member between a position where the upper ends of the flanges are elevated above the upper surface of the member and a position where the upper ends of said flanges are lowered below the upper surface of said member, thereby adjusting the intervals between objects transferred to the receiving conveyor as desired. The feed conveyor may be arranged to be operated intermittently so as to ensure transfer of only one object per cycle of the rotating shaft.

4 Claims, 15 Drawing Figures

APPARATUS FOR ADJUSTING INTERVALS OF OBJECTS BEING CONVEYED

This application is a continuation of application Ser. No. 038,215 filed May 11, 1979 and now abandoned, which is a continuation of application Ser. No. 782,040 filed Mar. 28, 1977, now abandoned, which is a continuation-in-part of application Ser. No. 591,041 filed June 27, 1975, now abandoned, which is a continuation-in-part of application Ser. No. 287,899 filed Sept. 11, 1972 and now abandoned.

BACKGROUND OF THE INVENTION

The present invention relates to an apparatus and method for adjusting intervals between soft objects conveyed on a feeding device such as a conveyor. More particularly, it relates to an apparatus positioned between a feed conveyor and a receiving conveyor in order to transfer soft objects such as confectionery or dough carried on the feed conveyor at irregular intervals to the receiving conveyor at desired intervals.

When materials being processed are fed on conveyors through various processing stations of a production line involving, for instance, a station where manual operations are preformed on the materials, regular distances between the materials are often difficult to maintain and subsequent processes inconvenienced, particularly when such subsequent processes require the materials to be fed at regular intervals.

DESCRIPTION OF THE PRIOR ART

One known device for adjusting intevals between materials fed on conveyor employs a shutter above the conveyor and arranged to move vertically towards and away from the conveyor, thereby closing and opening a passage for the progressive flow of materials on the moving conveyor so as to provide desired intervals between the materials. If the materials on the conveyor are spaced unevenly, and particularly if some of them are placed on the conveyor in such a manner that they have no space therebetween, it is impossible to lower the shutter between the materials without damaging them.

Another type of known device designed for the above purpose adjusts the intervals between materials fed on rotating rollers by changing the rotational speed of, or stopping, the relevant rollers by appropriate mechanical or electrical adjusting devices. Such a space adjusting means is most appropriate for objects having hard bottoms, such as luggage or packages, but not so for objects with soft bottoms such as confectionary or dough, because these objects tend to stick to rollers and would thus be damaged.

A further known alternative is to transfer materials from one conveyor to a second conveyor positioned at right angles to the first conveyor periodically by an appropriate push means.

Other known prior art includes devices to convey packages and vertically stacked rigid cards, but not confectionery and dough. Examples include U.S. Pat. No. 3,353,652 to Fellner, French Pat. No. 1,346,407 to Gallet and IBM Technical Disclosure Bulletin Vol. 14, No. 2, July, 1971, pages 464–465.

However, this prior art is completely unsuitable for adjusting intervals of soft objects such as confectionery or dough being conveyed. If soft objects were conveyed by this prior art, they would obviously be damaged or destroyed, thrown off or dislodged from the conveyor means by the coaction of disclosed elements such as stop bars, rollers and vertical knives. Confectionery or dough, for example, would be crushed, squeezed and/or mashed.

SUMMARY OF THE INVENTION

The present invention easily eliminates difficulties encountered in the prior art. According to the present invention, a combination of a slitted member and a rotating shaft having a plurality of flanges are positioned between a feed conveyor and a receiving conveyor, with the axis of the rotating body being at right angles to the direction of movement of the objects being conveyed between the conveyors. The slitted member is provided with a plurality of slits extending parallel to the direction of movement of the objects and arranged in such a manner that the flanges of the rotating shaft can freely pass through the slits. The slitted member also may have a projection ridge thereon adapted to be abutted by the conveyed objects which are to be spaced apart. The rotating shaft is positioned underneath the slitted member and is arranged to move vertically relative to the slitted member so that the flanges can be elevated or lowered relative to the slitted member. The upper surfaces of the flanges of the rotating body, when elevated, are at substantially the same level as the upper surface of the conveyors and, when lowered, said flanges retreat from the space above the upper surface of the slitted member.

When the rotating body is lowered to a certain level below the upper surface of the slitted member, objects are prevented from being further transported because the objects rest on the slitted member which does not function as a conveyor.

By adjusting the timing of reciprocal movements of the rotating body, by means of a variable speed motor and variable speed pulley, it is possible to adjust the intervals of the objects fed to the receiving conveyor and thereby adjust the intervals of the objects being conveyed as desired.

Thus, an object and result of the present invention is to provide a simple and efficient apparatus and method for adjusting the intervals of the objects being conveyed as desired.

Figure 2:
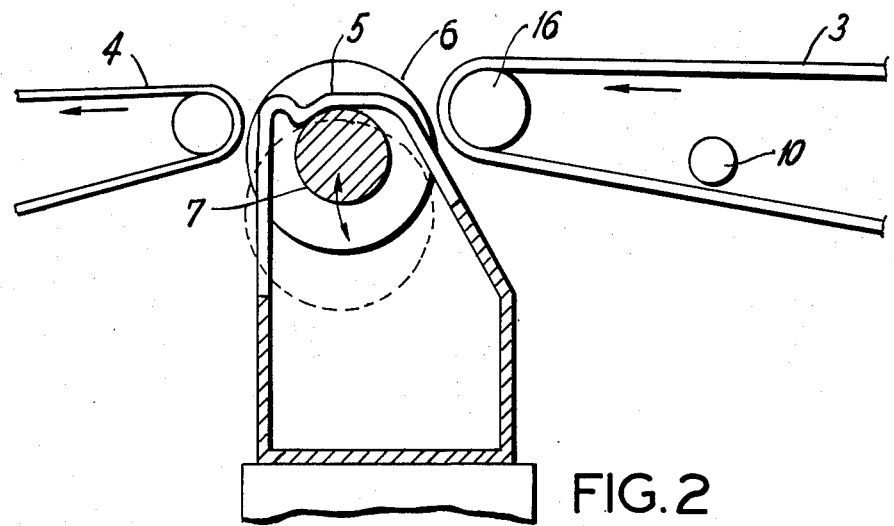
Figure 3:
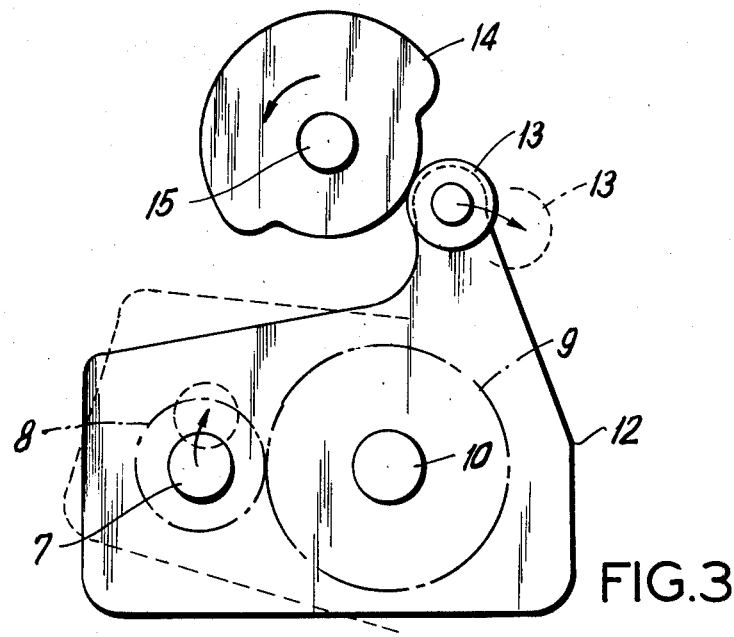
Figure 4:
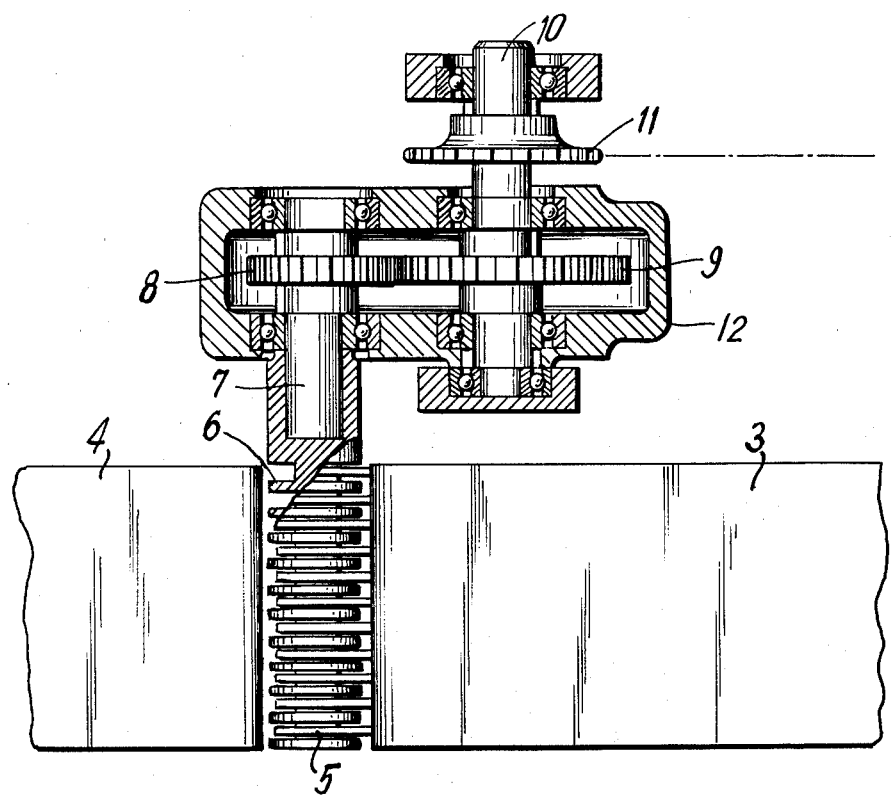
Figure 5:
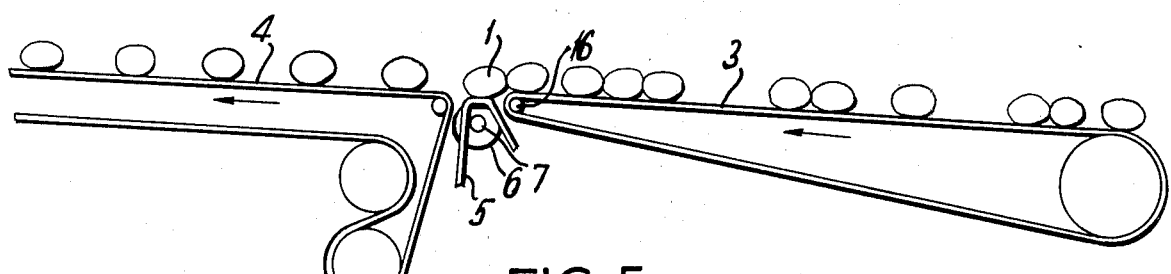

The above, and other objects, features and advantages of the invention will be apparent in the following detailed description of an illustrative embodiment thereof which is to be read in connection with the accompanying drawings wherein:

FIG. 1 is an upper plan view of an essential portion of an embodiment of the present invention, FIG. 2 is a sectional side view of an essential portion of the preferred embodiment of the present invention, FIG. 3 is a schematic side view of a transmission mechanism for the present invention, FIG. 4 is a plan view in section of the embodiment of FIGS. 1–3 with parts broken away, FIG. 5 is a schematic side view of an embodiment of the present invention in illustrating the operation of the embodiment when the rotating body is lowered.

Figure 6:
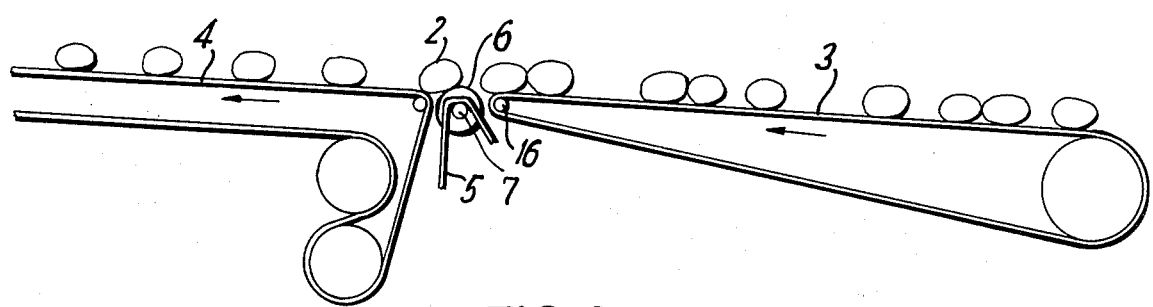
Figure 7:
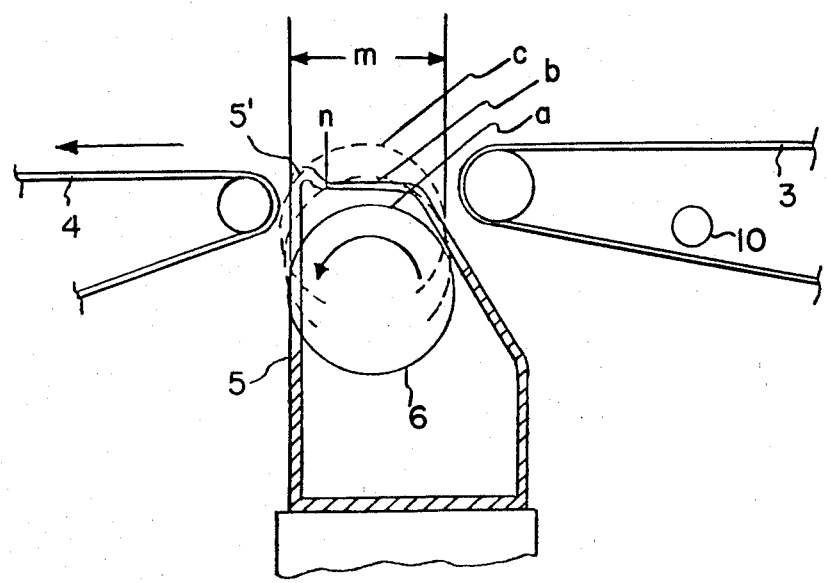
Figure 8A:
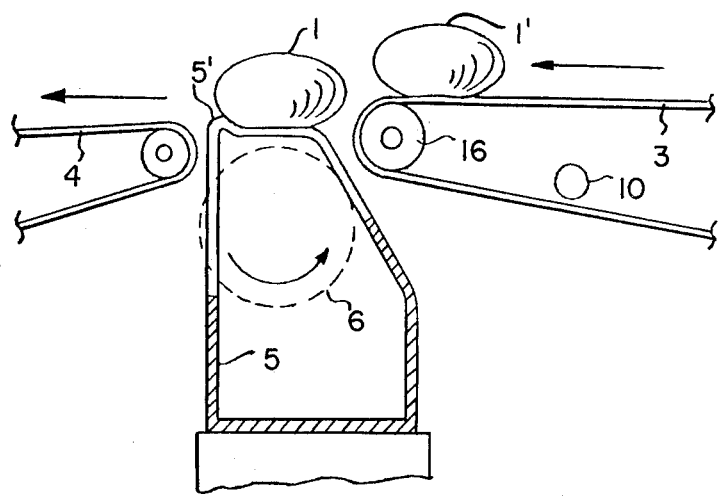
Figure 8B:
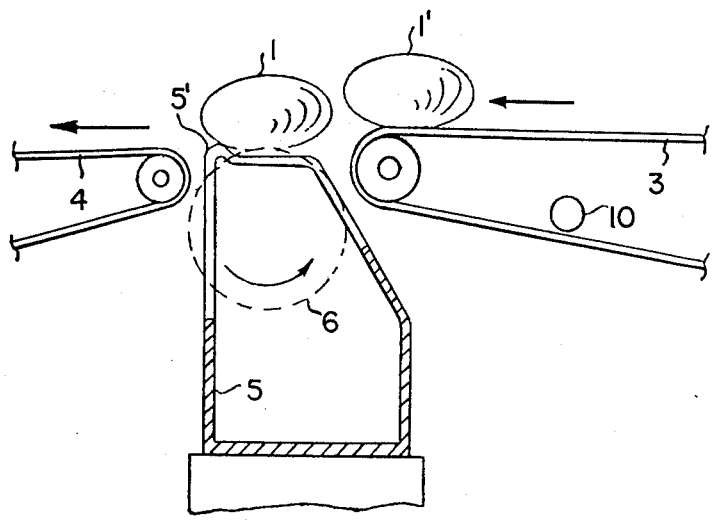
Figure 8C:
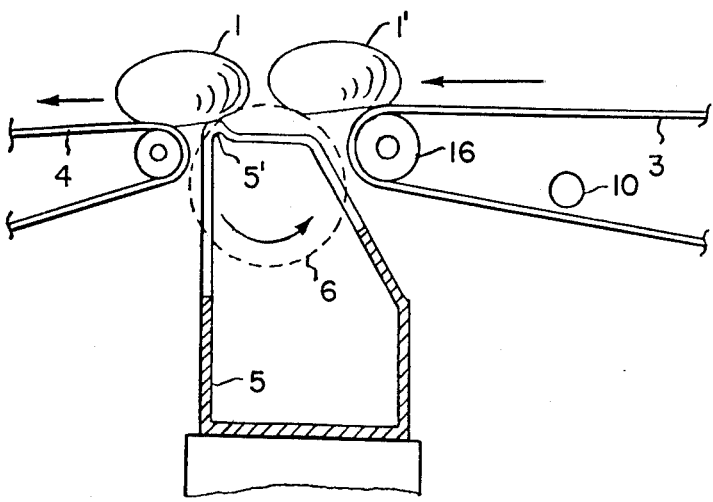
Figure 9A:
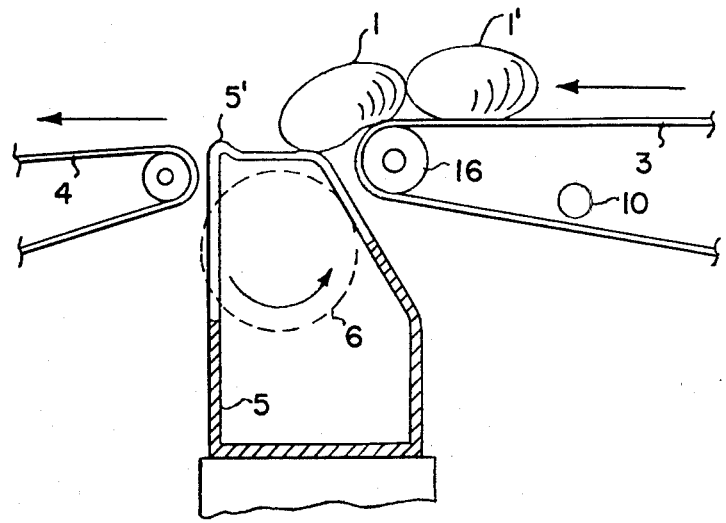
Figure 9B:
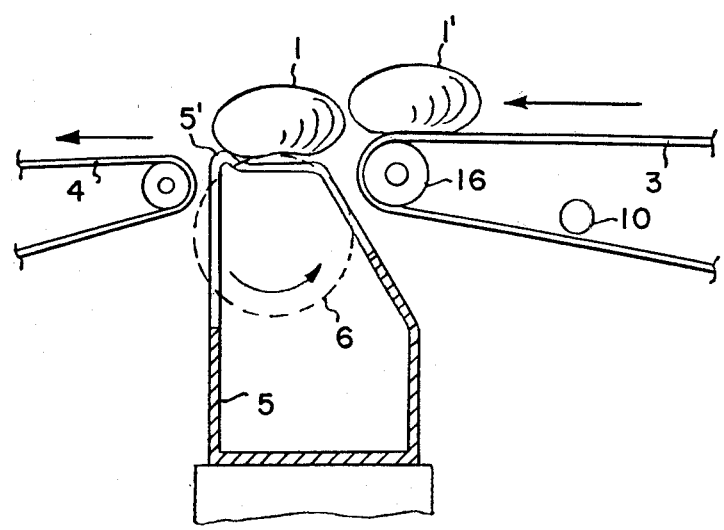

FIG. 6 is a view similar to FIG. 5 but illustrating the operation of the embodiment when the rotating body is elevated, FIG. 7 is a view analyzing various positions of the rotating elements of the apparatus, FIGS. 8A through 8C depict a sequence of operation of the apparatus, FIGS. 9A and 9B depict another sequence of operation of the apparatus in conditions different from FIGS. 8A through 8C, and FIGS. 10A through 10C depict another sequence of operation of the apparatus in conditions different from FIGS. 8A through 8C and 9A and 9B.

Referring now to the drawings, particularly FIG. 5 and FIG. 6, objects 1 being conveyed are fed on the feed conveyor 3 in the direction illustrated by the arrow and are transferred from the feed conveyor 3 to the receiving conveyor 4 which carries the objects 1 in the direction illustrated by the arrow. The objects are transferred from the feed conveyor 3 to the receiving conveyor 4 over the combination of a holding on slitted member 5 and a rotating body 6.

The slitted member 5, as illustrated in FIG. 1 and FIG. 2, is positioned at right angles to the direction of movement of the objects being conveyed. The member 5 is provided with a plurality of slits formed so as to provide a plurality of passageways extending parallel to the direction of movement of the objects. The upper surface of the slitted member may be flat or it may be provided on its downstream side with projection 5' as shown in FIG. 2.

Underneath the slitted member is positioned the shaft 7 of the rotating body 6, which is provided with a plurality of projections in the form of flanges each adapted to pass through respective slits or passageways of the slitted member when the rotating body is caused to move vertically upwards.

As illustrated in FIG. 3 and FIG. 4, a gear 8 is connected with an end of the shaft 7 of the rotating body 6 and meshes with a gear 9 connected to a shaft 10 fixed relative to the conveyors. The shaft 10 has a sprocket 11 mounted thereto and rotation of the sprocket 11 thus rotates the rotating body 6. The gears 8 and 9 are housed in a housing 12 which also supports the shafts 7 and 10. At an end of the housing 12 is mounted a cam follower 13, which is in engagement with a cam 14 fixed relative to the conveyors in a manner hereinafter described. The housing 12 is caused to oscillate about the shaft 10 in accordance with the curved surface of the cam 14 engaging the cam follower 13, and causes the shaft 7, and consequently the rotating body 6, to conduct reciprocal vertical movements in accordance with the configuration of the cam 14.

The flanges of the rotating body 6 are arranged so that when the rotating body 6 oscillates in vertical directions, the flanges are elevated above the slitted member 5 or disappear below the upper surface of the slitted member 5.

In general operation, when the upper ends of the flanges of the rotating body 6 are positioned below the upper surface of the member 5, any object 1 fed from the feed conveyor 3 may rests against the member 5 and is prevented from being further transported by projection in ridge 5'. When, however, the flanges of the rotating body 6 are elevated above the upper surface of the slitted member 5, the object 2 is transferred from the feed conveyor 3 to the receiving conveyor 4 by the rotation of the rotating body 6. Regular vertical movements of the rotating body enables the positioning of objects on the receiving conveyor at regular intervals. The cam 14 is mounted on a cam shaft 15 which is driven by a variable speed pulley (not shown); the variable speed pulley is driven through a gear train by a variable speed motor. Feed conveyor shaft 16, which drives the feed conveyor is driven by the same variable speed pulley that drives the cam shaft 15 and, thus, is synchronized with movements of cam shaft 15. The receiving conveyor belt moves at a constant speed and is driven independently of said cam shaft by the same variable speed motor.

Furthermore, the cam surface of the cam 14 may be changed, thereby changing the dwell time and thus increasing or decreasing the intervals between the objects placed on the receiving conveyor 4.

FIG. 7 illustrates three situations which may arise during operation of an apparatus having the projections 5' on the slitted member.

Situation 1—The flanges of the rotating body 6 are positioned at a and thus the object stops at the end of the feed conveyor 3 after it first touches member 5.

Situation 2—The flanges of the rotating body 6 are positioned at b and thus the object, if it is positioned spaced back from the rear end n of the projection or ridges 5', progresses to n.

Situation 3—The flanges of the rotating body 6 are positioned at c and thus the object encounters no obstacles in its path and progresses from the feed conveyor 3 to the receiving conveyor 4.

The slitted member, the ridge or projection on the slitted member and the vertically oscillating flange member enable determination of the position at which objects are caused to stop, and minimize variations in the distance between the moved objects as they proceed on the receiving conveyor 4.

It has been found that where ridge or projection 5' is not provided, soft doughlike objects may stop when the rotating body 6 is retracted downward beneath the slitted member 5 at any place along the path m, depending upon the moment at which the object is brought to the slitted member 5. Thus, the distance between any adjacent pair or objects on the receiving conveyor 4 may vary up to the length of m.

Since it is desirable, ordinarily, that the length of m is substantially the same as the length of the bottom of the object being conveyed, the above variation in the length between any pair of the adjacent objects becomes significant in operation and sometimes the purpose of adjusting intervals systematically is unattainable without the ridge of projection 5'.

Where the projection 5' is provided, in situation 2 described above, the projection functions to adjust the place at which the object stops and causes it to stop always at position n, thereby equalizing the distance between adjacent objects.

Three cases are presented which arise depending upon the manner in which objects are fed from the feed conveyor:

Case (1)—when an object being conveyed is fed onto the slitted member in a regular manner where the subsequent object being conveyed is spaced a sufficient distance from the preceding object;

Case (2)—when an object has landed on the slitted member in an irregular manner; and Case (3)—when an object is fed onto the slitted member while a subsequent object follows the preceding object without any interval in between the two objects or when the objects touch.

Case (1)

This is the usual situation. An object being conveyed when it is transferred onto the slitted member, progresses in such a manner that its forward end engages the projection 5', partly moved by its own inertia and partly by the pushing action of the moving belt of the feed conveyor 3. This normally happens even when the rotating body 6 is positioned below the upper surface of the slitted member 5.

The mechanism of the interval adjustment in this case is illustrated in FIGS. 8A-8C.

In FIG. 8A, the object 1 conveyed by the feed conveyor 3 to the slitted member 5 is transferred onto the slitted member 5 and is stopped by the projection 5'.

In FIG. 8B, the upper portion of the rotating body 6 rises above the upper surface of the slitted member 5 and raises the object 1 thereon.

In FIG. 8C, the rotating body 7 is at its highest position. By the guiding motion of the rotating body, the object 1 is transferred over projection 5' onto the receiving conveyor 4 positioned on substantially the same level as the rotating body 6.

Case (2)

Referring to FIG. 9A, an object 1 is illustrated to have landed on the slitted member 5 in an irregular manner. It has been found that there are cases where objects stop on the slitted member 5 in the position as illustrated for reasons such as even the slight difference in height between the major portion of the upper surface of slitted member 5 and the feed conveyor 3.

In FIG. 9B, the upper portion of the rotating body 6 rises slightly beyond the upper surface of the slitted member 5. The object 1 progresses above the slitted member 5, guided by the rotating body 6, and stops at the ridge or projection 5'.

Where adjacent objects are sticky, and the first lands in an irregular manner, the rotational speed of the rotating body 6 may be increased to be substantially higher than the speed of movement of the feed conveyor 3, so that the object 1 on the rotating body 6 may be separated from the subsequent object 1'.

Case (3)

Figure 10A:
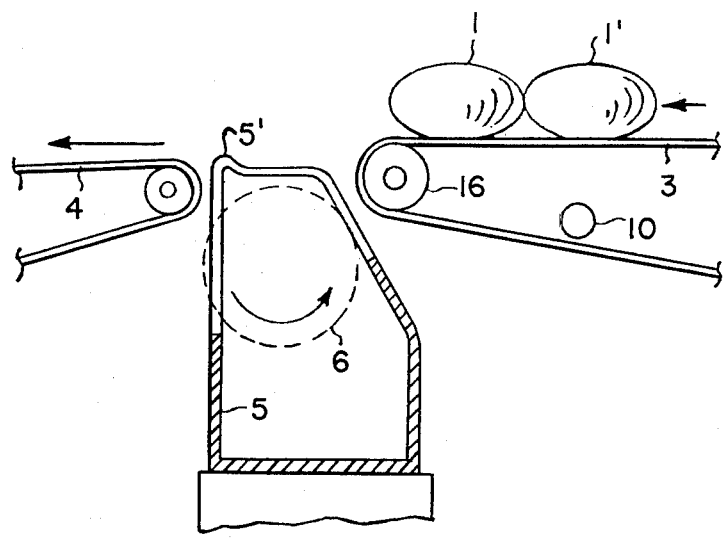

Referring to FIG. 10A, object 1 and 1' being conveyed on the feed conveyor 3 have no space between them. They are touching each other.

Figure 10B:
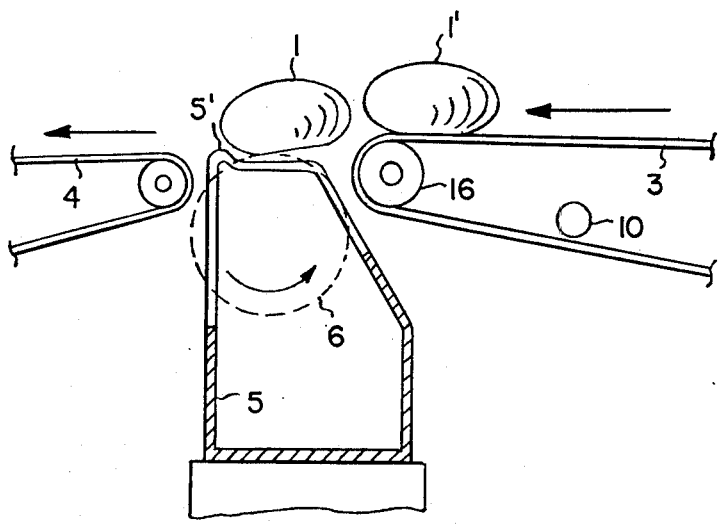

In FIG. 10B, when the upper portion of the rotating body 6 rises slightly above the upper surface of the slitted member 5, the first object 1 is quickly pulled onto the portion above the slitted member 5 and into contact with projection 5'.

Figure 10C:
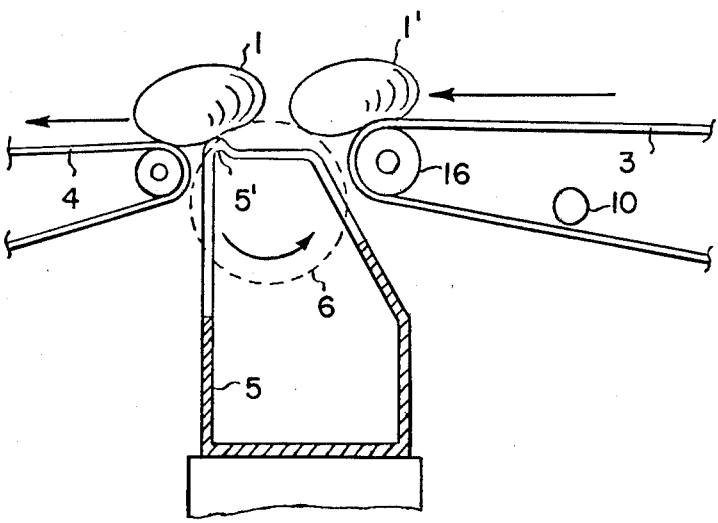

In FIG. 10C, when the rotating body 6 further rises, the object 1 is transferred onto the receiving conveyor 4, while the subsequent object 1' is separated from the first object 1 because it does not come into contact with the rotating body 6 during the transfer of the first object 1. The subsequent object 1' may progress onto the rotating body 6, but by that time the downward movement of the rotating body 6 results in the subsequent object 1' stopping before the projection 5'.

I claim:

1. An apparatus for adjusting intervals between objects being transported on a series of conveyors, comprising
    means including a holding member fixed in position between two of said conveyors for fully supporting each said object individually and retarding movement of said objects from one to the other of said two conveyors, said holding member having a purality of slotted passageways extending between said two conveyors;
    a shaft secured for rotation beneath said passageways and having a plurality of radial flanges each aligned with a respective one of said passageways; and
    control means operatively associated with said shaft for repetitively raising and lower said shaft in a predetermined sequence for protruding said flanges through said passageways to raise objects held thereon and carry them from one to the other of said two conveyors during rotation of said shaft and thereafter withdrawing them from said passageways, whereby the intervals between the objects may be adjusted without harm to the objects even if they should have soft bottoms.

2. An apparatus according to claim 1, said control means including a pivotal member carrying said shaft at one end and a cam follower at the other end whereby said pivotal member may be pivoted to re-position said shaft upon movement of said cam follower.

3. An apparatus according to claim 2, said control means including a cam adapted to engage said cam follow.

4. An apparatus according to claim 1, the first of said conveyors being positively driven.

* * * * *